US00RE37031E

(19) United States
(12) Reissued Patent
Nishiwaki

(10) Patent Number: US RE37,031 E
(45) Date of Reissued Patent: Jan. 30, 2001

(54) PRINTER PROVIDING SECURITY FOR PRINTOUT

(75) Inventor: Hirofumi Nishiwaki, Yokohama (JP)

(73) Assignee: Ricoh Company, Ltd., Tokyo (JP)

(21) Appl. No.: 09/249,271

(22) Filed: Feb. 11, 1999

Related U.S. Patent Documents

Reissue of:
(64) Patent No.: 5,602,973
Issued: Feb. 11, 1997
Appl. No.: 08/312,814
Filed: Sep. 27, 1994

(30) Foreign Application Priority Data

Sep. 30, 1993 (JP) ..... 5-245678

(51) Int. Cl.[7] ..... G06K 15/00

(52) U.S. Cl. ..... 358/1.14; 271/298; 358/1.1

(58) Field of Search ..... 395/113, 101, 395/111; 271/298, 290; 358/402, 403, 1.14, 1.1; 379/100.08; 340/825.31; 399/366

(56) References Cited

U.S. PATENT DOCUMENTS

| | | | | |
|---|---|---|---|---|
| 4,437,660 | * | 3/1984 | Tompkins et al. | 271/298 |
| 4,470,356 | * | 9/1984 | Davis et al. | 271/292 |
| 4,698,630 | * | 10/1987 | Ellsberg | 340/825.31 |
| 5,034,770 | * | 7/1991 | O'Connell | 399/79 |
| 5,295,181 | * | 3/1994 | Kuo | 379/100.08 |
| 5,342,034 | * | 8/1994 | Mandel et al. | 270/58.01 |
| 5,358,238 | * | 10/1994 | Mandel et al. | 271/298 |
| 5,435,544 | * | 7/1995 | Mandel | 271/298 |
| 5,513,013 | * | 4/1996 | Kuo | 271/298 |

FOREIGN PATENT DOCUMENTS 0 241 273 * 10/1987 (EP) .

* cited by examiner

*Primary Examiner*—Dwayne D. Bost
*Assistant Examiner*—Tracy M. Legree
(74) *Attorney, Agent, or Firm*—Cooper & Dunham LLP

(57) ABSTRACT

A printer accepting print requests from a plurality of users comprising bins storing printout and locks each locking a corresponding one of the bins, wherein the printer locks one of the bins and delivers the printouts to that one of the bins.

30 Claims, 9 Drawing Sheets

| ID | PRINTOUT:1 NO PRINTOUT:0 | LOCKED:1 UNLOCKED:0 |
|---|---|---|
| 1 | 1 | 0 |
| 2 | 1 | 1 |
| 3 | 0 | 0 |
| ⋮ | ⋮ | ⋮ |

| ID | PRINTOUT:1 NO PRINTOUT:0 | LOCKED:1 UNLOCKED:0 | UNABLE TO BE USED:1 ABLE TO BE USED:0 |
|---|---|---|---|
| 1 | 1 | 0 | 1 |
| 2 | 1 | 1 | 0 |
| 3 | 0 | 0 | 0 |
| ⋮ | ⋮ | ⋮ | ⋮ |

PRINTER PROVIDING SECURITY FOR PRINTOUT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to printers, and particularly relates to a printer which has a function of locking bins containing printouts so that the security of each printed material can be protected.

2. Description of the Prior Art

In recent years, networking technologies for information processing systems have seen a rapid and significant development, and networking is employed in most organizations in order to allow users to share such resources as database on hard-disks, a computing power of server machines, a printer, etc., through a platform they are using which can access other resources via the network. In such a network, one or more printer servers centrally manage print jobs by accepting print requests from users, spooling print data, and sending print data to a printer when the printer is ready.

In an environment where many users share one or more printers, printouts from more than one user end up being stacked in one bin and mixed together. In order to avoid this awkward situation, printers of various types have a plurality of bins which can be allocated to individual users or user groups so that each user or each user group can have printouts without having them mixed with other users' or other groups' printouts.

While this type of printer can obviate the problem of printouts being mixed together, there is another problem of how to protect security, which is inherent in any resource sharing systems.

In computers, for example, each user's files can usually be protected from unauthorized access from other users, and such protection can be implemented by various protection modes set through attribute data attached to each file. Thus, protected files cannot be read or executed by other users if so protected, so that violation of security or accidental damage to on files by other users can be prevented.

For printers shared by many users, however, the prior art has not addressed any means for protection for printed documents. For example, if a user wishes to print out a security-sensitive document, the user may have to go to a printer site, wait for the printout to come out from the printer, and take the printout before someone else has a chance to look at or take the printout by accident. To avoid this situation, a user might wish to have the user's own printer with the user's computer. This renders meaningless the very meaning of having a network to share resources such as a printer for cost-effective purposes.

The printers which have a plurality of bins can also have a lock for each of the bins. Keys for those locks may be distributed to each individual or each group so that each can make one's bin secure by locking it with the key. In this case, however, users or user groups in a larger number than the number of the bins cannot share the printer. One solution might be to allocate some of the bins to privileged users or user groups who can have a key for the allocated bin, while other users share the rest of the bins without the privilege of security. However, this does not provide each user with a solution for the problem of the security of printouts in an environment of networking and sharing a printer.

Accordingly, there is a need in the field of printers for a printer which can provide security for printouts by locking bins containing printouts so as to prevent other users from having access to security-sensitive printouts.

SUMMARY OF THE INVENTION

Accordingly, it is a general object of the present invention to provide a printer which can satisfy the need described above.

It is another and more specific object of the present invention to provide a printer which can provide security for printouts by locking bins containing printouts so as to prevent other users from having access to security sensitive printouts.

In order to achieve the above objects, a printer according to the present invention [accepting] *accepts* print requests from a plurality of users [comprising] *and comprises* bins storing printouts and locks each locking a corresponding one of the bins, wherein the printer locks one of the bins and delivers the printouts to that one of the bins.

In one embodiment, a printer according to the present invention *is* connected to a host device and shared by a plurality of users [comprising] *and comprises* a printer unit printing printouts in response to a request from one of the users via the host device; bins, one of which is selected by the printer unit for storing the printouts, wherein a first identification known to the one of the users is assigned to the one of the bins selected by the printer unit; locks, each locking a corresponding one of the bins; a mailbox unit for delivering the printouts to the one of the bins selected by the printer unit after locking the one of the bins; and a panel unit for receiving a second identification, wherein the mailbox unit unlocks the one of the bins when the first identification is identical to the second identification.

The printer of this configuration can assign an identification to a bin, lock the bin, and, then, deliver printouts to the bin. Since the user who requested the printing-out of the printouts knows the identification assigned to the bin, the user can enter the identification on the panel unit of the printer to unlock the bin. Thus, the printer according to the present invention can provide a security for printouts by locking bins containing printouts so as to prevent other users from having access to security-sensitive printouts.

Other objects and further features of the present invention will be apparent from the following detailed description when read in conjunction with the accompanying drawings.

DESCRIPTION OF THE PREFERRED EMBODIMENTS

In the following, a description of a printer according to the present invention will be given with reference to FIG. 1 to FIG. 11.

First, in order to clarify purposes which the printer of the present invention serves, an environment for the printer to be used will be described with reference to FIG. 1.

Figure 1:
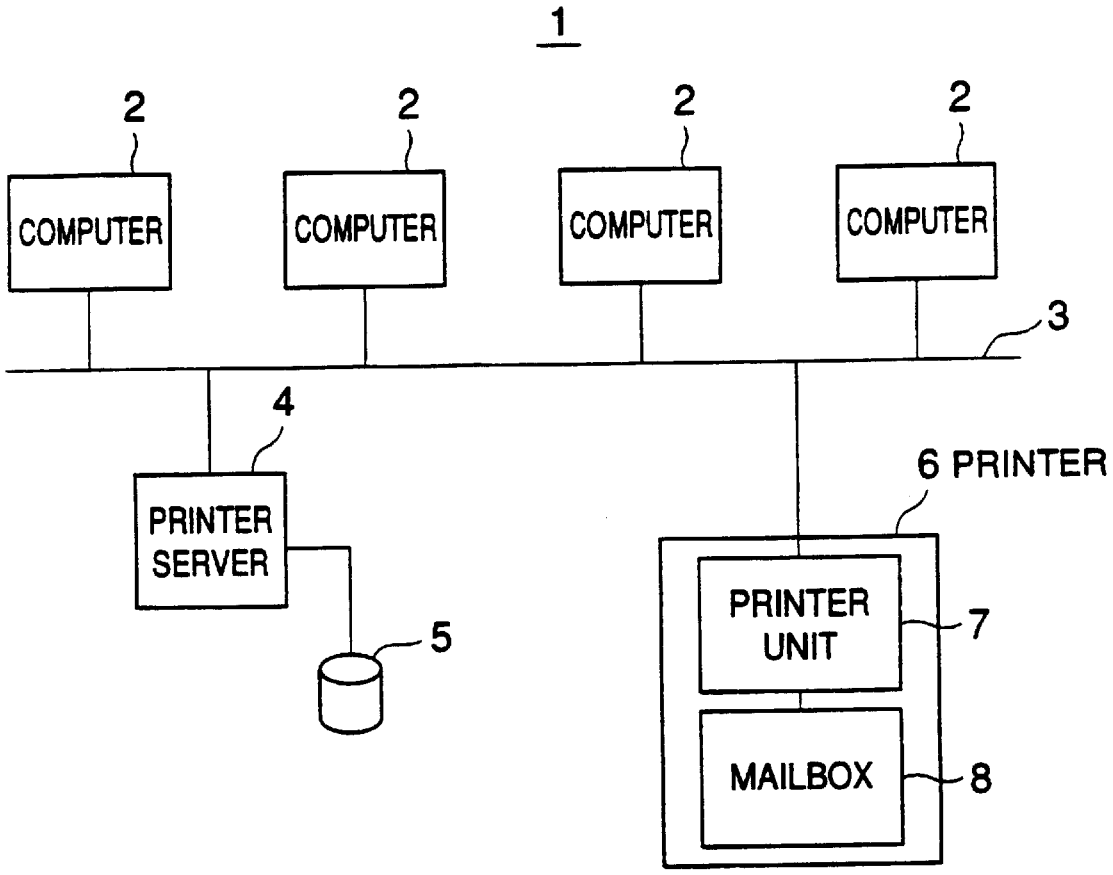
FIG. 1 is an illustrative drawing of a network using a printer according to the present invention.

FIG. 1 shows a network system 1 through which users can share various types of resources. The net work system 1 comprises computers 2, a link 3, a printer server 4, a hard-disk 5 connected to the printer server 4, and a printer 6. The function of the printer server 4 may not be limited only to that of a printer server but may as well include that of a database server, for example.

The printer 6 comprises a printer unit 7 for printing data supplied from the printer server 4 on a sheet of paper supplied from paper supply trays. The printer 6 also comprises a mailbox 8 for receiving printouts from the printer unit 7 and storing the printouts in a plurality of bins, each of which can be locked for securing a safety of the contents of the bin.

Users at the computers 2 give a print command to their computer 2 with an indication of data to be printed, such indication being typically a file name of the data to be printed. The print commands entered at the computers 2 are sent to the printer server 4, and, then, print jobs corresponding to the print commands along with corresponding data are spooled at the printer server 4, where spooling is an arriving order of print commands. Then, when the printer 6 is ready to handle a new print job after finishing off a previous print job, one of the spooled print data is sent to the printer 6.

The printer 6 prints the print data on sheets of paper, and sends out printouts to the mailbox 8, which delivers them to a selected bin. The selection of the bin may be done by the printer unit 7 or may be done by the user who gave a print request for this print data. In the former case, the ID of the bin may be sent to the user's computer to let him/her know which bin is going to be used for his/her printouts. In this manner, the computers need not have their own printer to print data out, yet printouts can be delivered and stored in separate bins without being mixed together.

For the security of printouts, a bin can be locked if a user wishes so, so that users using the computers 2 connected to this network can share the printer 6, yet can protect the security of their printouts. The mechanism and procedure of locking a bin will be described below in detail.

Figure 2:
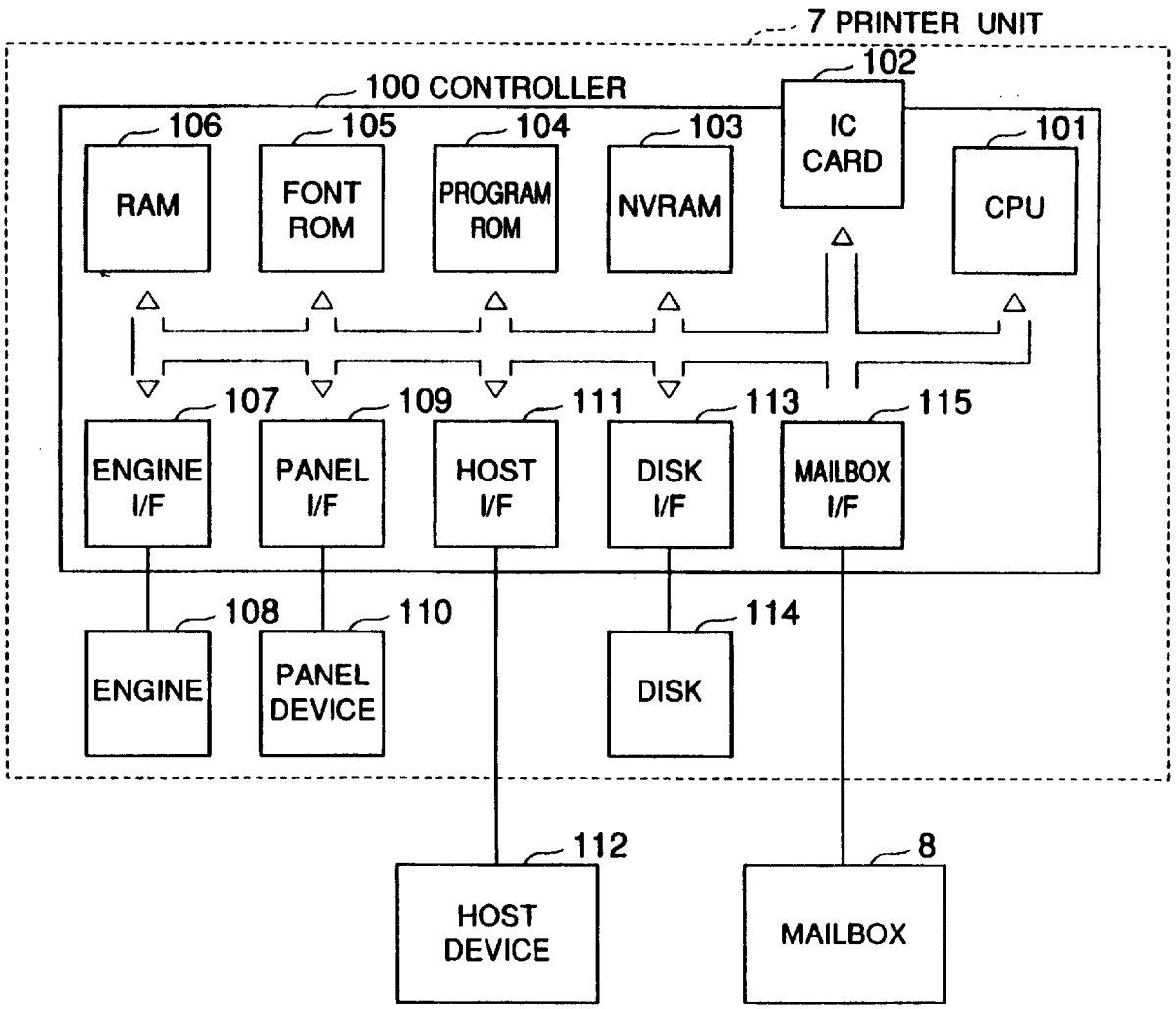
FIG. 2 is a block diagram of the printer unit of FIG. 1.

FIG. 2 shows a block diagram of the printer unit 7 of a first embodiment of the present invention. The printer unit 7 comprises a controller 100, an engine 108, a panel device 110, and a disk 114. The controller 100 controls the printer unit 7 as well as the mailbox 8, and exchanges a communication with a host device 112, which may be the printer server 4 in FIG. 1. The engine 108 prints data which is provided by the controller 100 on sheets of paper. The panel device 110 shows various statuses of the printer 6 on a display panel, and accepts instructions from users through operations on the panel. The disk 114 stores various data such as font data, programs, print data, etc.

The controller 100 comprises a CPU (Central Processing Unit) 101, an IC card 102, an NVRAM (Non-Volatile RAM) 103, a program ROM 104, a font ROM 105, a RAM 106, an engine I/F (interface) 107, a panel I/F 109, a host I/F 111, a disk I/F 113, and a mailbox I/F 115.

The CPU 101 controls the printer unit 7 in accordance with programs stored in the program ROM 104, commands given by a host device 112, and instructions given via the panel I/F 109 from the panel device 110. The IC card 102 is an input device for inputting externally such data as font data and programs. The NVRAM 103 is a non-volatile memory for storing information such as, for example, an instruction about a printer operation mode provided from the panel device 110. The program ROM 104 is a memory storing control programs for the controller 100. The font ROM 105 is a memory storing such data as font pattern data. The RAM 106 is a memory for providing a work space for the CPU 101, an input buffer for input data, a page buffer for print data, and a memory space for downloading fonts. The engine I/F 107 is an interface for communicating with the engine 108, exchanging commands, status information, print data, etc. The panel I/F 109 is an interface for exchanging commands and status information with the panel device 110. The host I/F 111 is an interface for communicating with the host device 112, and the disk I/F 113 is an interface for communicating with the disk device 114. The mailbox I/F 115 is an interface for communicating with the mailbox 8, and details of the communication will be described later.

Figure 3:
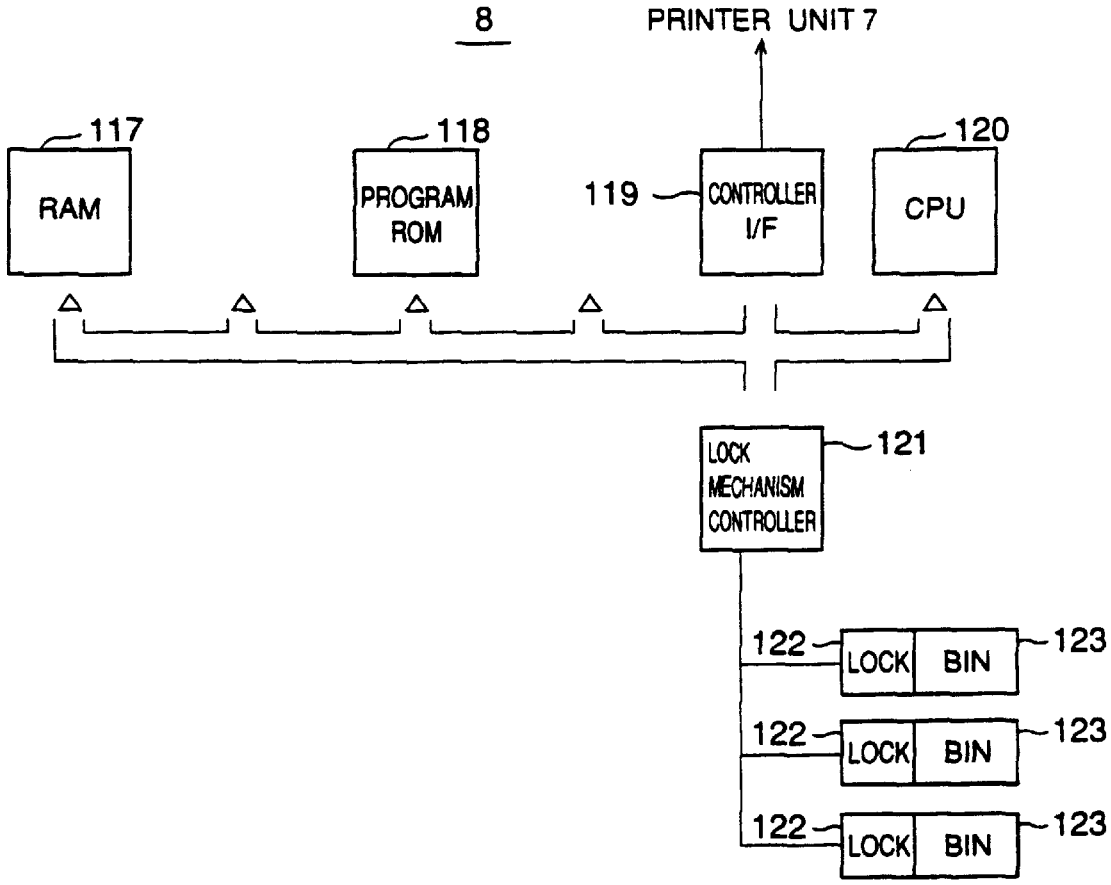
FIG. 3 is a block diagram of the mailbox of FIG. 1.

FIG. 3 shows a block diagram of the mailbox 8 of the first embodiment of the present invention. The mailbox 8 comprises a RAM 117, a program ROM 118, a controller I/F 119, a CPU 120, a lock mechanism controller 121, locks 122, and bins 123.

The RAM 117 is a memory for providing a work space for the CPU 120, and for storing data for information on each of the locks 122 and each of the bins 123. The program ROM 118 is a memory for storing programs which are used for controlling the mailbox 8 through the CPU 120. The controller I/F 119 is an interface for communicating with the controller 100 of the printer unit 7 in order to send information about each of the bins 123 and each of the locks 122 and receive commands regarding the locking of the locks 122. The CPU 120 controls the mailbox 8 in accordance with the programs stored in the program ROM 118 and commands given by the printer unit 7 via the controller I/F 119. The lock mechanism controller 121 controls each of the locks 122, and gets information on each lock 122 and each bin 123. Each of the locks 122 is a lock mechanism which may be electrically operated by the lock mechanism controller 121 for locking or unlocking a corresponding bin 123. The bins 123 are provided for storing printouts supplied by the printer unit 7.

Figure 4A:
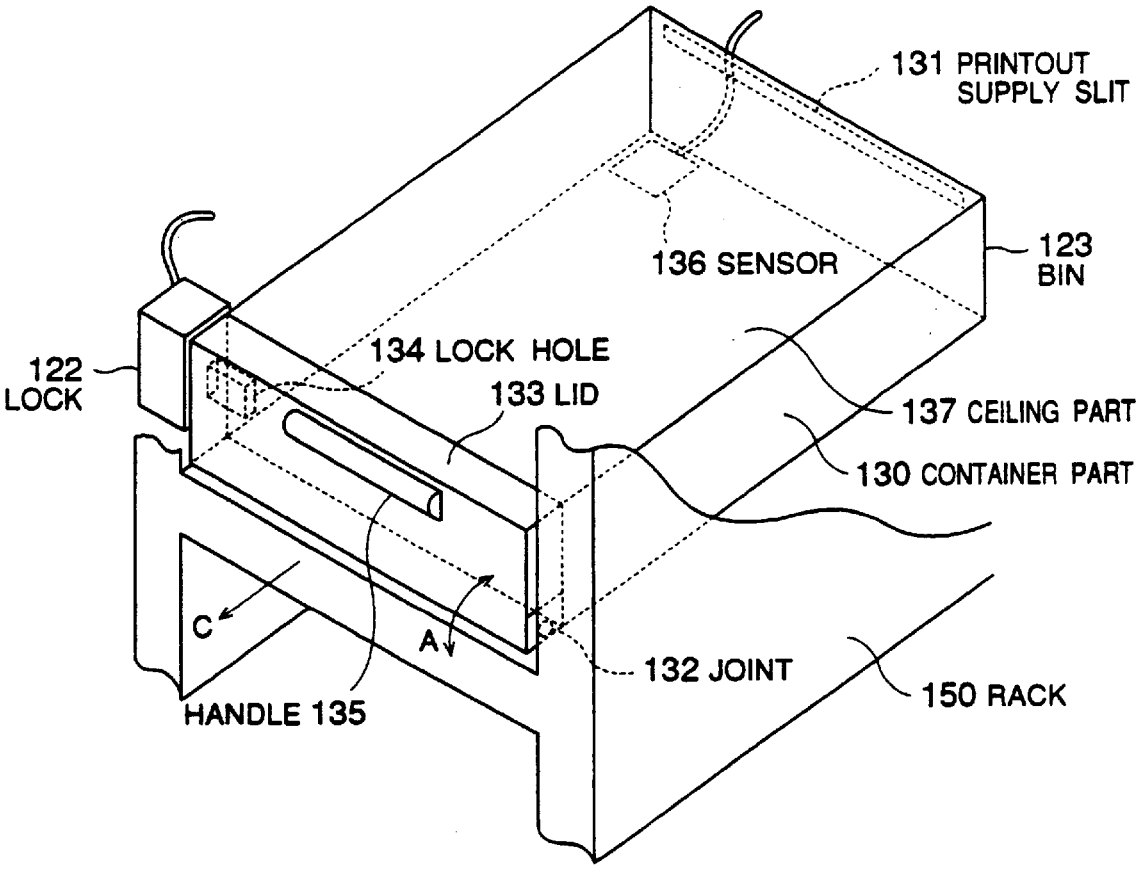
FIGS. 4A and 4B are an isometric view of a bin with a lock and an isometric view of the lock, respectively, according to a first embodiment of the present invention.
Figure 4B:
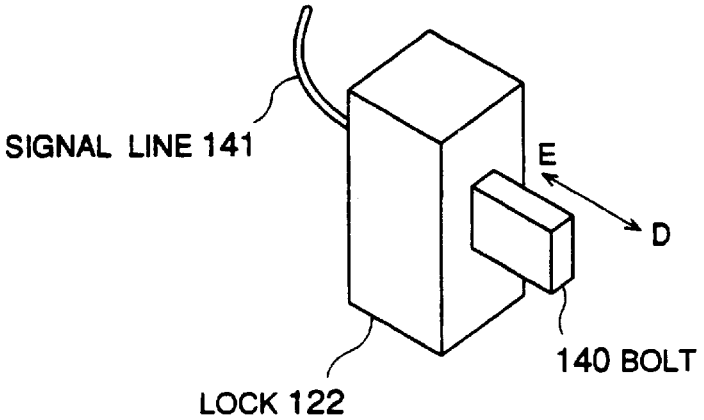

FIGS. 4A and 4B show an isometric vie of one of the bins 123 with a corresponding lock 122 and an isometric view of the lock 122, respectively.

In FIG. 4A, the bin 123 comprises a container part 130 for storing a stack of printouts, a printout supply slit 131 for putting printouts into the container part 130 sheet by sheet, a joint 132, and a lid 133 capable of opening in a direction A by swinging about a joint 132. The lid 133 includes a lock hole 134 for locking the lid 133 and a [protracted] *protrud-*

*ing* part 135 for providing users with a handle to hold when opening the lid 133. The bin 123 further comprises a sensor 136 for detecting whether there is a printout in the container part 130.

A plurality of the bins 123 may be arranged one over another in a rack 150 and be able to slide out of the rack 150 in a direction C, so that each of the bins 123 can be treated like a drawer with a lock mechanism. In this case, a ceiling 137 of the bin 123 may not exist so that users take out printouts from the openings after sliding the bin 123 out of the rack 150. The users may be able to open the lid 133 without sliding out the bin 123 so as to pull out printouts from the container part 130.

A plurality of the bins 123 may be formed integrally with the rack 150. In this case, a function of drawers is not provided so that users can only pull out printouts after opening the lid 133. Various different configurations of the bins 123 and the rack 150 can be proposed. However, since those are not essential parts of the present invention, no further description will be made on the variations of the configuration.

FIG. 4B shows an isometric view of the lock 122. The lock 122 includes a bolt 140 which can move in directions D and E. The lid 133 of the bin 123 is locked when the bolt 140 is in the position D and unlocked when the bolt 140 is in the position E. The lock mechanism controller 121 of FIG. 3 can electrically control the movement of the bolt 140 and get information about the position of the bolt 140 via signal lines 141.

An operation of the printer 6 according to the present invention will be described below with reference to FIG. 5 to FIG. 7.

Figure 5:
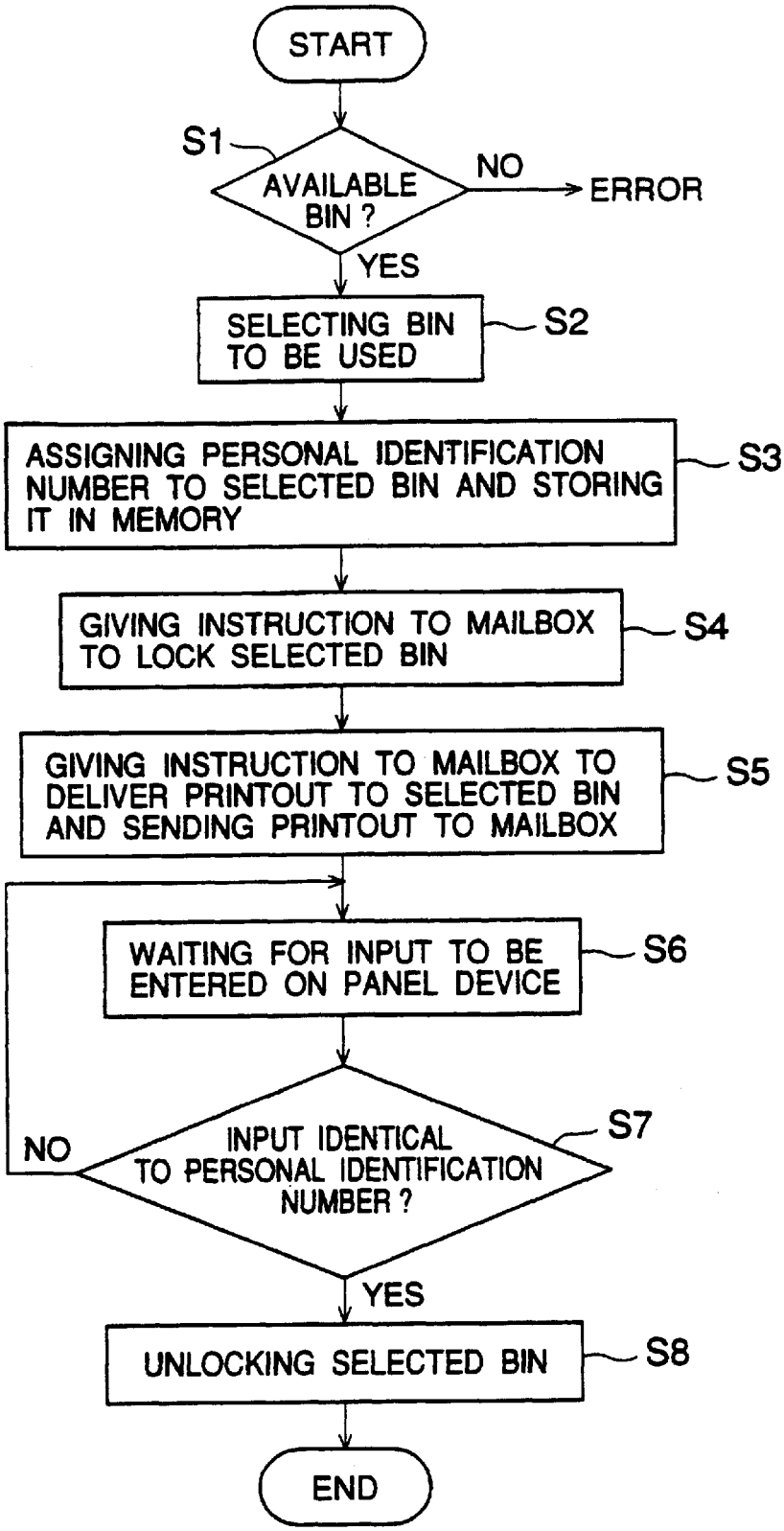
FIG. 5 is a flow chart of a procedure of locking a bin, delivering printouts, and unlocking the bin according to the first embodiment of the present invention.

FIG. 5 shows a flow chart of a procedure of printing printouts and the locking and unlocking of a corresponding one of the bins 123, according to the first embodiment of the present invention. In FIG. 5, an example of printing printouts and locking a corresponding bin 123 is shown. There are other cases in which a user may wish to print out data without locking the corresponding bin 123, or a user may wish to print out data in one of the bins 123 which is allocated for a shared use by all users. Nonetheless, the example of FIG. 5 shows essentials of the present invention, and various variations of the flow chart of FIG. 5 for varying cases can be made well within the ordinary skill in the art.

In FIG. 5, at a step S1, upon starting a print process, the controller 100 of the printer unit 7 decides whether there are available bins 123. Here, available bins 123 mean unlocked bins without any printouts therein. If there are no available bins 123, the print process may be stopped, or the shared bin may be selected to be used. In the latter case, the security of the printouts will not be protected. A straightforward way to handle the case of no available bins may be just to terminate the print process, and the printer 6 may notify the user of the termination of the print job along with a message of no available bins. In this way, the user him/herself can decide what to do next. The user may wish to have his/her printouts in the shared bin, or may wish to try to print them later when there is an available bin.

If there is at least one available bin 123, the procedure proceeds to a step S2. At the step S2, the controller 100 decides which bin is to be used among the available bins 123. If there is only one available bin, that is the one to be used.

At a step S3, the controller 100 assigns a personal identification number to the selected bin 123, and stores it into the RAM 106. The ID of the selected bin 123 and the personal identification number may be also sent to the host device 112 (a printer server) from the printer unit 7, and, then, sent to a computer which requested the print job. In this manner, the user of that computer can be informed of the ID of the selected bin 123 and the personal identification number to unlock the bin.

In the alternative, the user may create a personal identification number of his/her own by typing it in at his/her computer after receiving a request sent by the printer 6 to enter a personal identification number. In this configuration, the printer 6 may first send the request to the host device 112, which forwards it to the relevant computer. Then, the computer gets a personal identification number from its user, and sends it to the printer 6 via the host device 112. The CPU 101 of the printer unit 7 stores the personal identification number into the RAM 106 in the same manner as in the previous case.

At a step S4, the printer unit 7 gives an instruction to the mailbox 8 to lock the selected bin 123, so that the selected bin 123 is locked prior to receiving printouts. At a step S5, the printer unit 7 gives an instruction to the mailbox 8 to deliver printouts to the selected bin 123, and sends printouts to the mailbox 8. This is the end of the process of printing printouts and locking the bin 123. The rest of the flow chart of FIG. 5 shows a procedure of unlocking the selected bin 123.

At a step S6, the printer unit 7 waits for a personal identification number to be entered from the panel device 110 for the selected bin 123. At a step S7, upon receiving a personal identification number, the CPU 101 of the printer unit 7 compares the received personal identification number with the personal identification number stored in the RAM 106. If those two are the same, the printer unit 7 sends an instruction to the mailbox 8 to unlock the selected bin 123. This is the end of the process. If the result of the comparison is negative, the procedure goes back to the step S6 and waits for another personal identification number to be entered.

In this manner, the user can protect his/her printouts from being seen or taken by someone else. Also, the user can go to the printer site, and take his/her printouts out of the selected bin 123 by entering his/her personal identification number on the panel device 110.

Figures 6, 7:
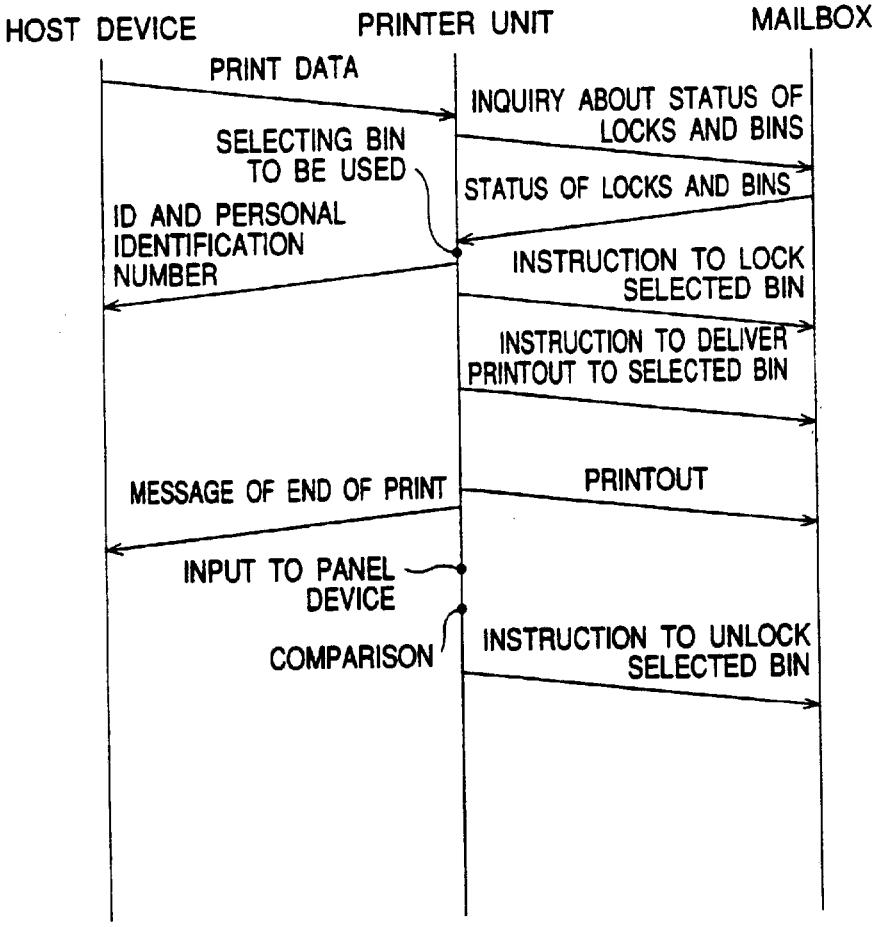
FIG. 6 is an illustrative drawing showing exchanges of commands and data between the host device, the printer unit, and the mailbox of FIG. 1.
FIG. 7 is an illustrative drawing showing a data table used in the first embodiment.

FIG. 6 shows communications exchanged between the host device 112, the printer unit 7, and the mailbox 8. With reference to FIG. 6, the data communication between those three will be described below.

In FIG. 6, upon receiving print data, the printer unit 7 starts a print process by sending an inquiry to the mailbox 8 about the status of the locks 122 and the bins 123. The mailbox 8 checks each of the locks 122 and each of the bins 123 with regard to its status, i.e., whether the lock is locked and whether the bin has any printouts therein. After gathering information about the status of the locks 122 and the bins 123, the mailbox 8 sends the information to the printer unit 7. The data communication up to this point corresponds to the step S1 of FIG. 5

Then, after the determination of the bin 123 to be used, the printer unit 7 may send to the host device 112 the ID and the personal identification number of the selected bin 123. This corresponds to the step S3 of FIG. 5. Then, the printer unit 7 sends an instruction to lock the selected bin 123 to the mailbox 8, which locks the lock 122 of the selected bin 123 as instructed. This corresponds to the step S4 of FIG. 5.

Then, the printer unit 7 sends an instruction to the mailbox 8 to deliver printouts to the selected bin 123, and sends printouts to the mailbox 8. This corresponds to the step S5 of FIG. 5.

When printing-out is finished, the printer unit 7 may send a message indicating the end of printing-out to the host device 112. In FIG. 6, the transmission of the ID and the personal identification number of the selected bin 123 is made before the printer unit 7 sends the lock instruction. Instead, the printer unit 7 may send the ID and the personal identification number along with the message indicating the end of printing-out.

When a personal identification number received from the panel device 110 is identical to the personal identification number stored in the RAM 106, the printer unit 7 sends the mailbox 8 an instruction to unlock the lock 122 of the selected bin 123. Then, the mailbox 8 unlocks the lock 122 as instructed. These correspond to the step S8 of FIG. 5.

FIG. 7 shows a data table which contains information about the status of the locks 122 and the bins 123, and is used in the process of determining the bin to be used. The data table includes ID numbers for the bins 123, flags each indicating whether a corresponding bin 123 has a printout therein, and flags each indicating the status of a corresponding lock 122. In FIG. 7, the existence of a printout is indicated by a "1", and the status of the lock being locked is indicated by a "1". The data table of FIG. 7 is stored in the RAM 106 of the printer unit 7 and the RAM 117 of the mailbox 116. As described with reference to FIG. 6, the status of the locks 122 and the bins 123 are gathered by the mailbox 8 upon a request from the printer unit 7. When the mailbox 8 finishes the updating of the data table stored in the RAM 117, the mailbox 8 sends the data table to the printer unit 7.

Using the data table containing the status of the locks 122 and the bins 123, the CPU 101 of the printer unit 7 determines which one of the bins 123 is to be used. This may be done by making a search from the top of the data table for a bin for which the second column and the third column are both "0", meaning that the bin is unlocked and contains no printouts. When such a bin is found, this bin is the bin to be used. For example, if the ID numbers are assigned in an ascending order to the bins 123 from the top to the bottom in the rack 150, making a search from the top of the data table may be equivalent to making a search for an unlocked and empty bin from the top of the rack 150.

A search for a bin to be used need not be made from the top of the data table, instead, it may be made from the bottom of the data table. Or the procedure of determining a bin to be used may be completely different, and, for example, the user him/herself may decide a bin to be used among available bins 123 by looking up a list of the available bins 123.

Figure 8:
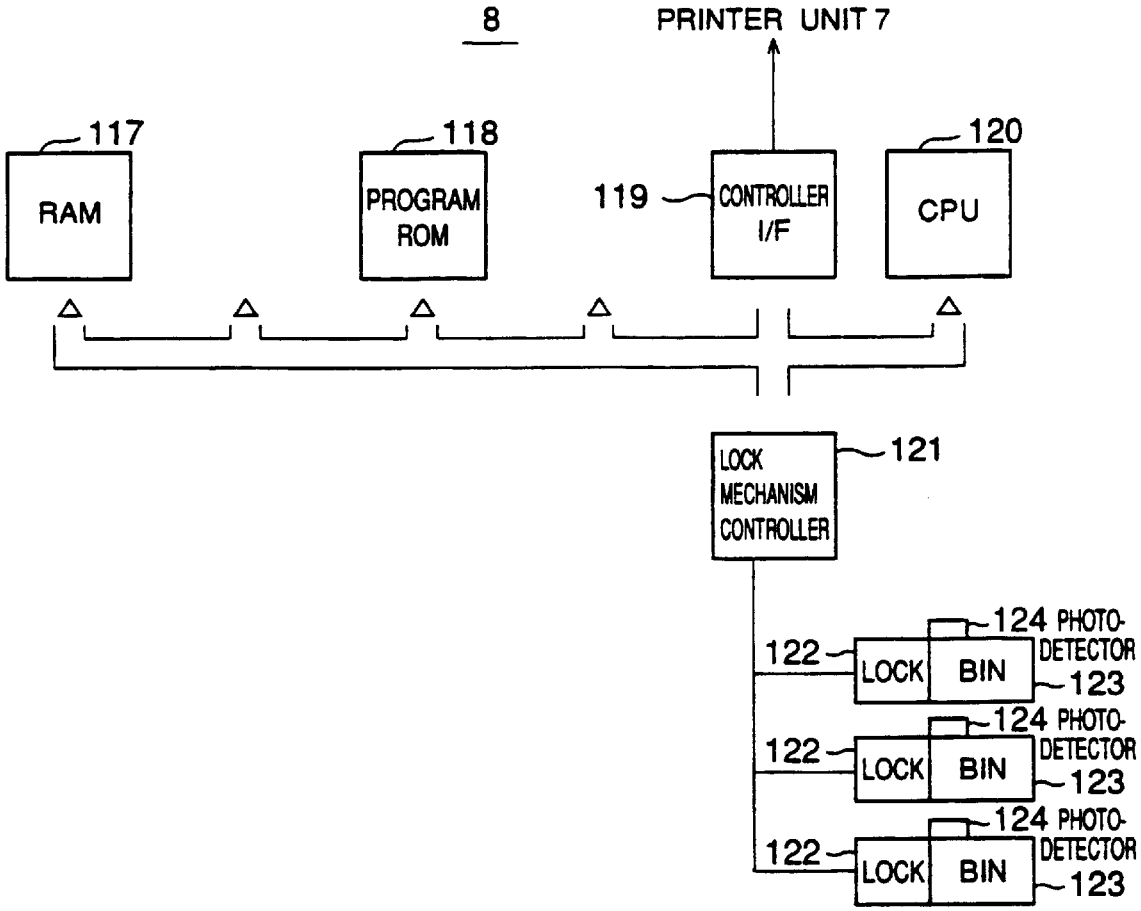
FIG. 8 is a block diagram of the mailbox of a second embodiment.
Figures 9, 10:
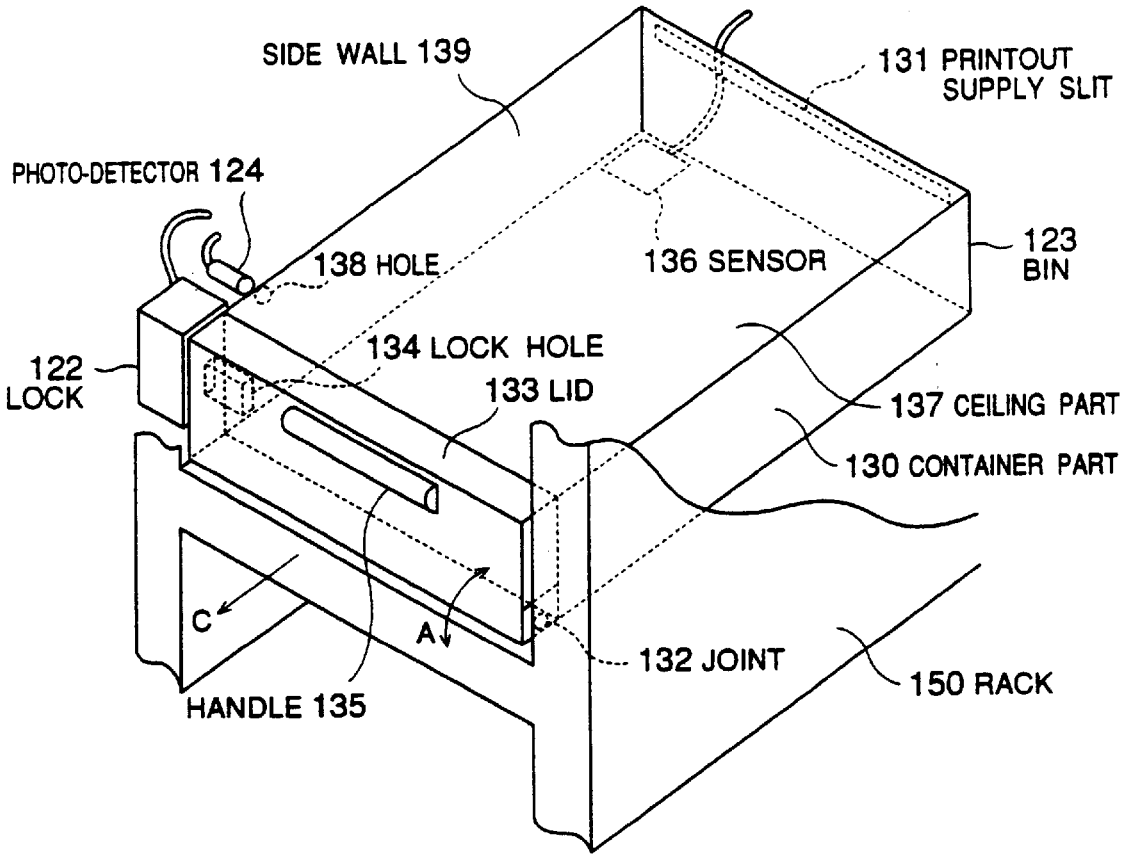
FIG. 9 is an isometric view of a bin with a lock of the second embodiment.
FIG. 10 is an illustrative drawing showing a data table used in the second embodiment.

FIG. 8 and FIG. 9 show a second embodiment of the present invention. In this embodiment of FIG. 8 and FIG. 9, a photodetector 124 is provided for each of the bins 123 in order to detect both whether the corresponding bin 123 is full of printouts and whether the corresponding bin 123 is in a position of being slid out of the rack 150. In the case of printouts filling the bin 123, the photodetector 124 detects the existence of printouts filling the bin 123 through a hole 138 of FIG. 9. In the case of the bin 123 being slid out of the rack 150, the photodetector 124 detects in front of it the existence of a side wall 139, which means that the bin 123 is being slid out.

Being provided with the photodetector 124, the printer unit 7 can exclude from a list of available bins 123 a bin filled with printouts and a bin in a slid out position making it impossible to lock the bin.

In the second embodiment, the data table for containing information about the status of the locks 122 and the bins 123 has one more column as shown in FIG. 10. In the fourth column of FIG. 10, a "1" indicates that the bin cannot be used because it is full of printouts or in a slid out position. In order to determine a bin to be used, a search may be made for a bin whose columns are all "0", from the top of the data table as in the first embodiment.

As described before, there may be provided a shared bin 123 for the use of all users. The role of the shared bin 123 can be allocated to the top bin of the data table, the bottom bin of the data table, or any bin in the data table. The shared bin 123 must be unable to be locked by any user, and there are plenty of ways to achieve this. A straightforward way is to provide physically no lock to the shared bin, and to exclude this shared bin from the procedure of FIG. 5. Actually, the shared bin need not be excluded from the procedure, since the shared bin cannot be locked and will never be listed as one of the available bins. Another way to achieve the above objective is to design the programs stored in the RAM 106 in an appropriate way. For example, the search for a available bin 123 may be designed to skip the shared bin 123.

When a user wishes to print out his/her document to the shared bin, the user may request it at the time of issuing a print job, for example, by specifying the use of the shared bin as an option of a print command. On the other hand, the use of the shared bin may be a default of the print command, while the use of a bin with a lock may be requested as an option.

In the same manner, a user may wish to print his/her document without locking it up while preventing it from being mixed with other printouts. In such a case, the user may request so with an option of the print command. Then, the printer unit 7 may make a list of available bins 123 by finding bins with no printout therein, and just deliver printouts to one of the available bins without locking it.

If a user wishes to print security-sensitive documents several times without being interrupted by going to the printer site, the user may end up using several bins simultaneously, which diminishes the chance for other users to be able to use a bin with a lock. In order to prevent this, the programs stored in the program ROM 104 of the printer unit 7 can be modified in such a way that one user can use the same bin several times which has been locked since the user used it the first time.

Figure 11:
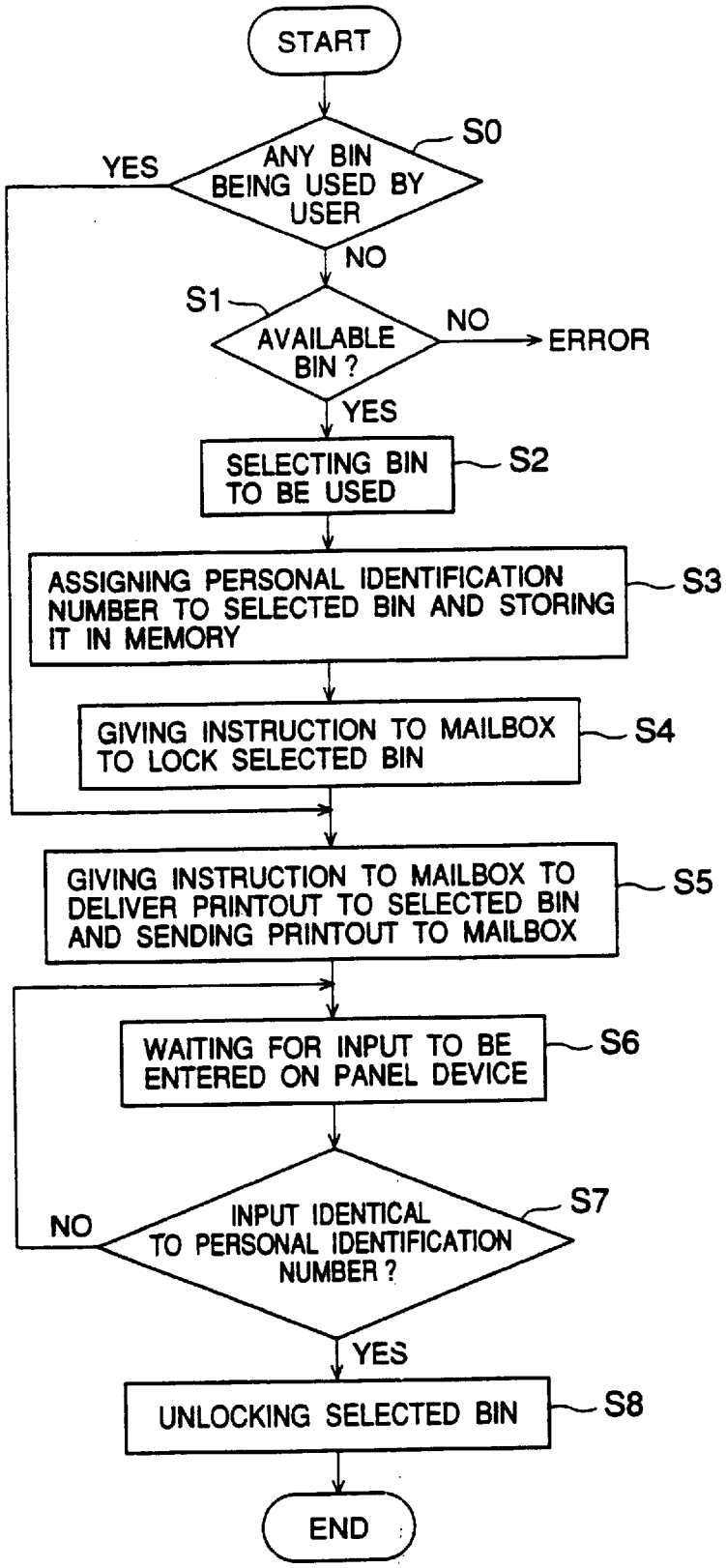
FIG. 11 is a flow chart of a procedure of a third embodiment.

FIG. 11 is a flow chart showing a procedure of a third embodiment of the present invention which allows a user to print out documents to the same bin more than one time.

The procedure of FIG. 11 differs from the procedure of FIG. 5 only in a step S0, so that the other steps S1 to S8 will not be given any further description. At the step S0 upon starting a print process, the printer unit 7 determines whether there is an available bin used by the user who requested this print process. If there is an available bin used by the user, the procedure goes to the step S5 to deliver printouts to the selected bin 123 which is the bin used by the user in this case. If there is not an available bin used by the user, the procedure proceeds to the step S1 to follow the same procedure as that of FIG. 5.

In the third embodiment, the printer unit 7 may have to know the IDs of users who are using locked bins, and the ID of a user who requested a print process. The IDs of users who are using locked bins can be provided in the data table stored in the RAM 106 of the printer unit 7. The ID of a user who requested a print process may be provided by the host device 112 (the printer server), and such function may be easy to implement for such a system as a UNIX system, since any process in a UNIX system is attached with the ID of the user who issued that process.

Further, the present invention is not limited to these embodiments, but various variations and modifications may be made without departing from the scope of the present invention.

What is claimed is:

1. A printer accepting print requests from a plurality of users comprising:

lockable bins for storing printouts; and locks each for locking a corresponding one of said bins, wherein said printer, in response to a user input, selectively leaves a selected lockable bin locked or unlocked and delivers the printouts to said selected lockable bin.

2. The printer claimed in claim 1, further comprising a plurality of printout detection means each for detecting the existence of a printout in a corresponding one of said bins so as to avoid locking one of said bins which has a printout already therein.

3. A printer connected to a host device and shared by a plurality of users comprising:

a printer unit printing printouts in response to a request from one of the users via the host device;

lockable bins, one of which is selected by said printer unit for storing the printouts, wherein a first identification known to said one of the users is assigned to the one of said lockable bins selected by said printer unit;

locks each for locking a corresponding one of said lockable bins;

mailbox means for selectively locking said one of said lockable bins selected by said printer unit and delivering the printouts to said one of said selected lockable bins, wherein said mailbox means, in response to a user input, selectively leaves a selected lockable bin locked or unlocked and delivers printouts to said selected lockable bin; and panel means for receiving a second identification, wherein said mailbox means unlocks said one of said lockable bins when said first identification is identical to said second identification.

4. The printer as claimed in claim 3, wherein said printer unit assigns said first identification to said one of said bins and sends said first identification to said one of the users via the host device so that said first identification can be known to said one of the users.

5. The printer as claimed in claim 3, wherein said first identification is assigned to said one of said bins via the host device by said one of the users.

6. The printer as claimed in claim 3, further comprising a plurality of printout detection means each for detecting the existence of a printout in a corresponding one of said bins so as to prevent said printer unit from selecting one of said bins which has a printout already therein.

7. The printer as claimed in claim 6, further comprising:

a plurality of fullness detection means each for detecting printouts filling a corresponding one of said bins;

a rack containing said bins; and a plurality of slid bin detection means each for detecting whether a corresponding one of said bins is slid out of said rack.

8. A method of selectively locking one of a plurality of locks each provided for a corresponding lockable bin of a printer which is connected to a host device and has a panel to receive data for unlocking one of said locks, said printer delivering printouts to one of said lockable bins in response to a request via the host device from one of users sharing said printer, said method comprising the steps of:

determining whether there is at least one available lockable bin from among said lockable bins;

selecting one of said lockable bins from said at least one available lockable bin;

in response to a user input requesting a locked bin, assigning a first identification assigned to the selected one of said lockable bins, said first identification being known to said one of the users and locking said selected one of said lockable bins;

delivering said printouts to said selected one of said lockable bins;

waiting for a second identification to be received by said panel;

comparing said first identification with said second identification;

unlocking said selected one of said lockable bins if said first identification is identical to said second identification; and in response to a user input requesting that a selected lockable bin not be locked, delivering said printouts to said selected one of said lockable bins without locking the selected lockable bin.

9. The method as claimed in claim 8, wherein said step of assigning said first identification comprises the steps of:

assigning said first identification to said selected one of said bins; and sending said first identification to said one of the users via the host device so that said first identification can be known to said one of the users.

10. The method as claimed in claim 8, wherein said step of assigning said first identification comprises the step of assigning to said selected one of said bins said first identification sent from said one of the users via the host device.

*11. The printer claimed in claim 1, further comprising: (a) a panel accepting a first identification code entered through operations on the panel; and (b) a controller coupled electronically to the panel and to the locks and responsive to said first identification code entered through operations on the panel to determine if the first identification code authorizes the unlocking of a selected one of said bins and, in case of a favorable determination, causing the lock corresponding to the selected bin to unlock the bin and thereby enable a user to remove printouts delivered thereto.*

*12. The printer claimed as in claim 11, in which said controller comprises a memory storing a second identification code assigned to said selected bin, and makes the determination whether the first identification code authorizes the unlocking of the selected bin depending on whether the first identification code matches the second identification code.*

*13. The printer claimed in claim 12, in which a user selects said second identification code and supplies the second identification code to the printer for storage in said memory.*

*14. The printer claimed in claim 13, including a network interface through which the printer receives said second identification code from a user.*

*15. The printer claimed in claim 12, in which said printer selects and generates said second identification code in response to a user's print request and stores the second identification code in said memory.*

*16. The printer claimed in claim 11, in which said printer comprises a printer unit printing said printouts and a mailbox secured thereto to which the printer unit delivers said printouts.*

*17. The printer claimed in claim 16, in which said mailbox incorporates said bins and locks.*

*18. The printer claimed in claim 16, in which said printer unit incorporates said controller and panel.*

*19. The printer claimed in claim 11, further comprising at least one interface circuit through which said controller is electronically coupled to said panel and said locks.*

*20. The printer claimed in claim 19, is which said at least one interface circuit comprises a first interface circuit through which said controller is coupled electronically to said panel and a second interface circuit through which said controller is electronically couple to said locks.*

*21. The printer claimed in claim 1, comprising a printer unit printing said printouts and a mailbox to which said printer delivers said printouts, said bins and locks being incorporated in said mailbox, said printer further including a panel, and said printer comprising a controller responding to a user's operations on the panel to unlock a selected locked bin.*

*22. The printer claimed in claim 21, in which said panel is incorporated in the printer unit.*

*23. The printer claimed in claim 21, in which said controller is incorporated in the printer unit.*

*24. The printer claimed in claim 1, in which said printer, in response to a user input, selects a locked bin for delivering printouts thereto, and delivers thereto more printouts resulting from more than one print jobs.*

*25. A printing process comprising the steps of:*

*providing a printer having a panel for accepting user inputs, a mailbox comprising a stack of lockable bins for the delivery of printouts thereto, and a plurality of locks each for selectively locking or unlocking a corresponding one of said bin to selectively leave the bin locked or unlocked;*

*selecting one of said bins, furnishing an identification code to the printer, and causing the lock corresponding to the selected bin to lock the bin;*

*printing a job and delivering printouts to the selected bin;*

*entering a bin unlocking code through user operations of the printer's panel;*

*determining if the identification code matches the bin unlocking code and, in case of a match, causing the lock corresponding to the selected bin to unlock the bin; and*

*sliding the bin at least partly out of the stack of bins to remove said printouts delivered thereto.*

*26. The printing process claimed in claim 25, in which said selecting of a bin comprises selecting a bin in response to a user's designation of a bin.*

*27. The printing process claimed in claim 26, in which said selecting of a bin comprises selecting a bin in response to a print request from a user, wherein said print request does not specify a bin.*

*28. The printing process claimed in claim 25, in which said furnishing of an identification code to the printer comprises furnishing an identification code selected by a user.*

*29. The printing process claimed in claim 28, in which said furnishing of an identification code selected by the user comprises furnishing the code as electronic data over a network to which the user and printer are connected via respective interface circuits.*

*30. The printing process claimed in claim 25, in which the printer comprises a printing unit and a mailbox, and the printer's panel through which the user enters said bin unlocking code is incorporated in the printing unit.*

* * * * *